(12) United States Patent
Jacob

(10) Patent No.: US 9,040,601 B2
(45) Date of Patent: *May 26, 2015

(54) CROSSLINKED COMPOSITIONS, METHOD OF MAKING THEM, AND ARTICLES COMPRISING THEM

(75) Inventor: Sunny Jacob, Seabrook, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 203 days.

This patent is subject to a terminal disclaimer.

(21) Appl. No.: 13/532,276

(22) Filed: Jun. 25, 2012

(65) Prior Publication Data

US 2012/0309862 A1 Dec. 6, 2012

Related U.S. Application Data

(63) Continuation-in-part of application No. PCT/US2010/050243, filed on Sep. 24, 2010.

(60) Provisional application No. 61/248,190, filed on Oct. 2, 2009.

(51) Int. Cl.
*C08L 23/14* (2006.01)
*C08L 23/10* (2006.01)

(52) U.S. Cl.
CPC .............. *C08L 23/145* (2013.01); *C08L 23/10* (2013.01); *C08L 2205/02* (2013.01); *C08L 2205/03* (2013.01); *C08L 2312/06* (2013.01)

(58) Field of Classification Search
CPC .............. C08L 23/145; C08L 2666/06; C08L 2666/02; C08L 2205/02; C08L 2205/03; C08L 2312/06
USPC ......... 522/161, 113, 120, 121, 116, 124, 125, 522/119, 157
See application file for complete search history.

(56) References Cited

U.S. PATENT DOCUMENTS

| | | | |
|---|---|---|---|
| 4,367,185 A * | 1/1983 | Nojiri et al. ............. | 264/416 |
| 5,560,886 A * | 10/1996 | Saito et al. ............. | 264/485 |
| 6,268,438 B1 | 7/2001 | Ellul et al. | |
| 6,342,565 B1 | 1/2002 | Cheng et al. | |
| 6,488,882 B2 * | 12/2002 | Lau et al. ............. | 264/494 |
| 6,500,563 B1 | 12/2002 | Datta et al. | |
| 6,525,157 B2 | 2/2003 | Cozewith et al. | |
| 6,569,915 B1 * | 5/2003 | Jackson et al. ......... | 522/112 |
| 6,642,316 B1 | 11/2003 | Datta et al. | |
| 6,790,874 B2 * | 9/2004 | Lau et al. ............. | 522/33 |
| 7,867,433 B2 | 1/2011 | Jacob et al. | |
| 8,178,031 B2 | 5/2012 | Jacob et al. | |
| 8,742,019 B2 * | 6/2014 | Jacob et al. ........... | 525/192 |
| 8,765,834 B2 * | 7/2014 | Jacob ................... | 522/110 |
| 2005/0107529 A1 | 5/2005 | Datta et al. | |
| 2005/0107530 A1 | 5/2005 | Datta et al. | |
| 2005/0107534 A1 | 5/2005 | Datta et al. | |
| 2005/0131142 A1 | 6/2005 | Datta et al. | |
| 2006/0102149 A1 | 5/2006 | Furusawa et al. | |
| 2006/0183861 A1 | 8/2006 | Harrington et al. | |
| 2006/0293461 A1 | 12/2006 | Jiang et al. | |
| 2007/0167553 A1 | 7/2007 | Westwood et al. | |

FOREIGN PATENT DOCUMENTS

| | | |
|---|---|---|
| EP | 0 374 695 | 6/1990 |
| EP | 0 946 640 | 10/1999 |
| EP | 0 969 043 | 1/2000 |
| EP | 1 003 814 | 5/2000 |
| EP | 1 634 919 | 3/2006 |
| WO | WO 98/27155 | 6/1998 |
| WO | WO 00/01766 | 1/2000 |
| WO | WO 00/69963 | 11/2000 |
| WO | WO 03/040233 | 5/2003 |
| WO | WO 2004/014988 | 2/2004 |
| WO | WO 2008/016467 | 2/2008 |
| WO | WO 2008/016518 | 2/2008 |
| WO | WO 2008/094741 | 8/2008 |

OTHER PUBLICATIONS

Ciba Irgafos 168 Product Bulletin from Ciba. (1999). [online]. Retrieved online on [Mar. 24, 2014]. Retrieve from internet <URL:http://pharosproject.net/uploads/files/sources/1828/1371572944.pdf>.*
Material Safety Data Sheet for Pro-Fax 7823 from Basell US Inc. [online]. Retrieved on [Oct. 14, 2014]. Retrieved from Internet: <URL:http://www.wppllc.com/intranet/content/RESPPR003BKV&NTV.PDF>.*
Technical Data Sheet from Ciba Specialty Chemicals for Irganox 1010, [online]. Retrieved on [Oct. 11, 2014]. Retrieved from Interent <URL://http://www.polivinilplastik.com/urunler/i1010.pdf>.*
Technical Information Sheet from BASF for Irganox B 225. [online]. Retrieved on [Oct. 11, 2014]. Retrieved from Internet <URL://http://www.google.com/url?sa=t&rct=j&q=&esrc=s&frm=1&source=web&cd=2&ved=0CCgQFjAB&url=http%3A%2F%2Fwww.ichemco.it%2Fgd.ashx%3Ftipodoc%3DF26iddoc%3D4816%26lng%3D%2520%-26idcli%3D007358&ei=UOo-VOGnDLPgsATo2oHQCg&usg=AFQjCNF>.*

* cited by examiner

*Primary Examiner* — Sanza McClendon

(57) ABSTRACT

The present invention relates to a composition comprising at least one propylene-based polymer comprising less than 0.1 wt. % diene-derived units based on the weight of the propylene-based polymer, an antioxidant, and a co-agent. The composition can be at least partially crosslinked by electron beam irradiation in a dose of less than 200 kGy, and may be further formed into articles including fibers, yarns, films, and nonwovens, among others. The propylene-based polymer of the present invention may be a polymer blend formed by forming a reactor blend from of two or more polymers produced in two or more reactors.

24 Claims, 2 Drawing Sheets

CROSSLINKED COMPOSITIONS, METHOD OF MAKING THEM, AND ARTICLES COMPRISING THEM

PRIORITY CLAIM

This application is a continuation-in-part of International Application PCT/US2010/050243, filed Sep. 24, 2010, which claims the benefit of U.S. Provisional Patent Application No. 61/248,190, filed Oct. 2, 2009, the disclosure of all of which are incorporated herein by reference in their entirety.

CROSS REFERENCE TO RELATED APPLICATIONS

This application is related to U.S. application Ser. No. 13/273,323, filed Oct. 14, 2011, and U.S. application Ser. No. 12/130,745, filed May 30, 2008, now U.S. Pat. No. 7,867,433, the disclosures of which are incorporated herein by reference in its entirety.

FIELD OF THE INVENTION

The present invention relates to a crosslinkable composition and a crosslinked composition, in particular to a composition comprising propylene-based polymer that substantially lacks diene-derived units, and to a method for making the same.

BACKGROUND OF THE INVENTION

Polyolefin polymers and polymer blends are known for their versatility and applicability in a wide variety of uses. In particular, many polyolefin polymers, including copolymers of propylene with other α-olefins such as ethylene, are well suited for use in applications requiring good stretchability, elasticity, and strength. Materials with good stretchability and elasticity are used to manufacture a variety of disposable articles in addition to durable articles including but not limited to incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer.

While numerous materials are known to exhibit excellent stress-strain properties and elasticity at room temperatures, it is often desirable for elastic materials to provide a conforming or secure fit during repeated use, during extensions and retractions at elevated or depressed temperatures, or in automobile interiors during summer months. Elasticity at elevated temperatures is also important for maintaining tight tolerances throughout temperature cycles. In particular, elastic materials used for repeated wear clothing or garments are preferred to maintain their integrity and elastic performance after laundering.

Spandex, a segmented polyurethane urea elastic material, is currently used in various durable fabrics. For example, fibers made from Spandex have been used in launderable apparels, fabrics, durable and disposable furnishing, beddings, etc. Similar to conventional uncrosslinked polyolefin-based elastic materials, articles made from Spandex can lose integrity, shape, and elastic properties when subjected to elevated temperatures. Thus, Spandex is not suitable for many co-knitting applications with high temperature fibers, such as polyester fibers.

Propylene-based polymers having good elastic properties are known and have been used for stretchable clothing. See, for example, U.S. Pat. No. 6,525,157 and U.S. Pat. No. 6,342,565. U.S. Pat. No. 6,342,565, in particular, discloses a soft, set-resistant, annealed fiber comprising a blend of polyolefins. The blend has a flexural modulus less than or equal to 12,000 psi and includes from 75 to 98 wt. % of a first polymer component and is from 2 to 25 wt. % of a second polymer component. The first polymer component is a propylene-ethylene polymer having at least 80 wt. % propylene and up to 20 wt. % ethylene, a melting point (Tm) by DSC in the range of from 25 to 70° C., and a heat of fusion less than 25 J/g. The second polymer component is a stereoregular isotactic polypropylene having a melting point by DSC of greater than 130° C., and a heat of fusion greater than 120 J/g. The fiber exhibits a resistance to set equal to or less than 80% from a 400% tensile deformation. The polyolefin blend is said to be substantially non-crosslinked.

U.S. Pat. No. 6,500,563 discloses blends of two different types of polypropylene, including blends made from a polypropylene having a Tm of less than 110° C. and propylene-ethylene copolymer that has isotactically arranged propylene derived sequences and Tm less than 105° C.

U.S. Publication No. 2006/0183861 discloses blends of at least two polymers incorporating propylene-derived units and process for producing such blends. The first polymer of the blend is a low crystallinity polymer including propylene-derived units. The second polymer is a high crystallinity polymer including propylene-derived units. The polymer blends exhibit the beneficial performance characteristics of low crystallinity propylene polymers while minimizing certain processing and handling problems associated with low crystallinity propylene polymers.

U.S. Publication No. 2005/0107534 A1 discloses curable and cured composition comprising a propylene-based elastomer optionally including a diene, and having isotactic polypropylene crystallinity, a melting point by DSC equal to or less than 110° C., and a heat of fusion of from 5 J/g to 50 J/g. The disclosure includes a blend composition comprising any of the propylene-based elastomers. The disclosure also includes compositions comprising any of the propylene-based elastomers and 1 to 100 parts by weight of inorganic filler per 100 parts of polymer.

Three component blends of isotactic polypropylene impact modifying amounts of an ethylene-propylene based rubber or low density ethylene copolymer and a propylene-based elastomer as compatibilizer are described in EP 0946640, EP 0946641, EP 0969043 and EP 1098934.

International publication No. WO 04/014988 describes blends of isotactic polypropylene with non-functionalized plasticizers such as poly-alpha-olefins. International Publication No. WO 03/040233 also discloses two component blends with the isotactic polypropylene as the predominant, matrix phase and the propylene-based copolymer serving as an impact modifier.

EP 1003814 and U.S. Pat. No. 6,642,316 disclose two-component blends of small amounts of isotactic polypropylene and predominant amounts of an ethylene based elastomer. EP 0374695 discloses visually homogeneous two component blends, however, using 40 wt. % or less of the propylene-based copolymer. WO 00/69963 describes films made of two-component blends with from 75 to 98 wt. % of a propylene ethylene based elastomer having a heat of fusion of less than 25 J/g.

Other related references include International Publication No. WO 2006/102419, U.S. Publication Nos.: 2005/0107529; 2005/0107530; 2005/0131142; and 2005/0107534.

SUMMARY OF THE INVENTION

The present invention is directed to a composition comprising one or more propylene-based polymers substantially lacking diene-derived units, one or more antioxidants, and one or more co-agents, and to a method for making such a composition. In some embodiments, the one or more propylene-based polymers may be a polymer blend formed by forming a reactor blend of two or more polymers produced in two or more reactors. The present invention also provides a crosslinked composition. In some embodiments, the crosslinked composition can be prepared by exposure to electron beams, and may be further formed into articles including fibers, films, and nonwovens, among others. The compositions described herein are expected to exhibit improved mechanical and elastic properties and pellet stability when compared to similar materials known in the art. These compositions are useful preparing fibers for apparels, diaper yarns elastic stretch engine for hygiene and Femcare applications, films with the stretch performance for apparel elastic bands, high performance film of elastic laminate structures for the hygiene business and the like.

In one aspect, the invention provides a method for making a crosslinked composition comprising the step of crosslinking the composition using electron beam radiation having an electron beam dose of about 200 kGy or less, the composition comprising:
 i) a propylene-based polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the propylene-based polymer;
 ii) at least one of a multifunctional acrylate, multifunctional methacrylate, functionalized polybutadiene resin, functionalized cyanurate, and allyl isocyanurate; and
 iii) at least one of a hindered phenol, phosphite, and hindered amine.

In some embodiments, the propylene-based polymer is a polymer blend formed by forming a reactor blend of a first polymer formed in a first reactor and a second polymer formed in a second reactor, the first polymer comprising from about 75 to about 99 wt. % propylene-derived units, from about 1 to about 25 wt. % ethylene and/or $C_4$-$C_{20}$ α-olefin-derived units, and less than 0.1 wt. % diene-derived units, based on the weight of the first polymer; and the second polymer comprising from about 75 to about 99 wt. % propylene-derived units, from about 1 to about 25 wt. % ethylene and/or $C_4$-$C_{20}$ α-olefin-derived units, and less than 0.1 wt. % diene-derived units, based on the weight of the second polymer.

In another aspect, the invention provides a composition comprising:
 i) a polymer blend formed by forming a reactor blend of a first polymer formed in a first reactor and a second polymer formed in a second reactor, the first polymer comprising from about 75 wt. % to about 99 wt. % propylene-derived units, from about 1 wt. % to about 25 wt. % ethylene and/or $C_4$-$C_{20}$ α-olefin-derived units, and less than 0.05 wt. % diene-derived units based on the weight of the first polymer; and the second polymer comprising from about 75 wt. % to about 99 wt. % propylene-derived units, from about 1 wt. % to about 25 wt. % ethylene and/or $C_4$-$C_{20}$ α-olefin-derived units, and less than 0.05 wt. % diene-derived units based on the weight of the second polymer;
 ii) at least one of a multifunctional acrylate, multifunctional methacrylate, functionalized polybutadiene resin, functionalized cyanurate, and allyl isocyanurate; and
 iii) at least one of a hindered phenol, phosphite, and hindered amine.

In another aspect, the invention provides a crosslinked composition, comprising:
 i) a propylene-based polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the propylene-based polymer;
 ii) at least one of a multifunctional acrylate, multifunctional methacrylate, functionalized polybutadiene resin, functionalized cyanurate, and allyl isocyanurate; and
 iii) at least one of a hindered phenol, phosphite, and hindered amine; and
 iv) a polyolefinic thermoplastic resin; and
 wherein the crosslinked composition has greater than 40% xylene insolubles as measured according to ASTM-D 5492.

In some embodiments of the above aspects, the propylene-based elastomer substantially lacks diene-derived units.

DETAILED DESCRIPTION OF THE INVENTION

Figure 1:
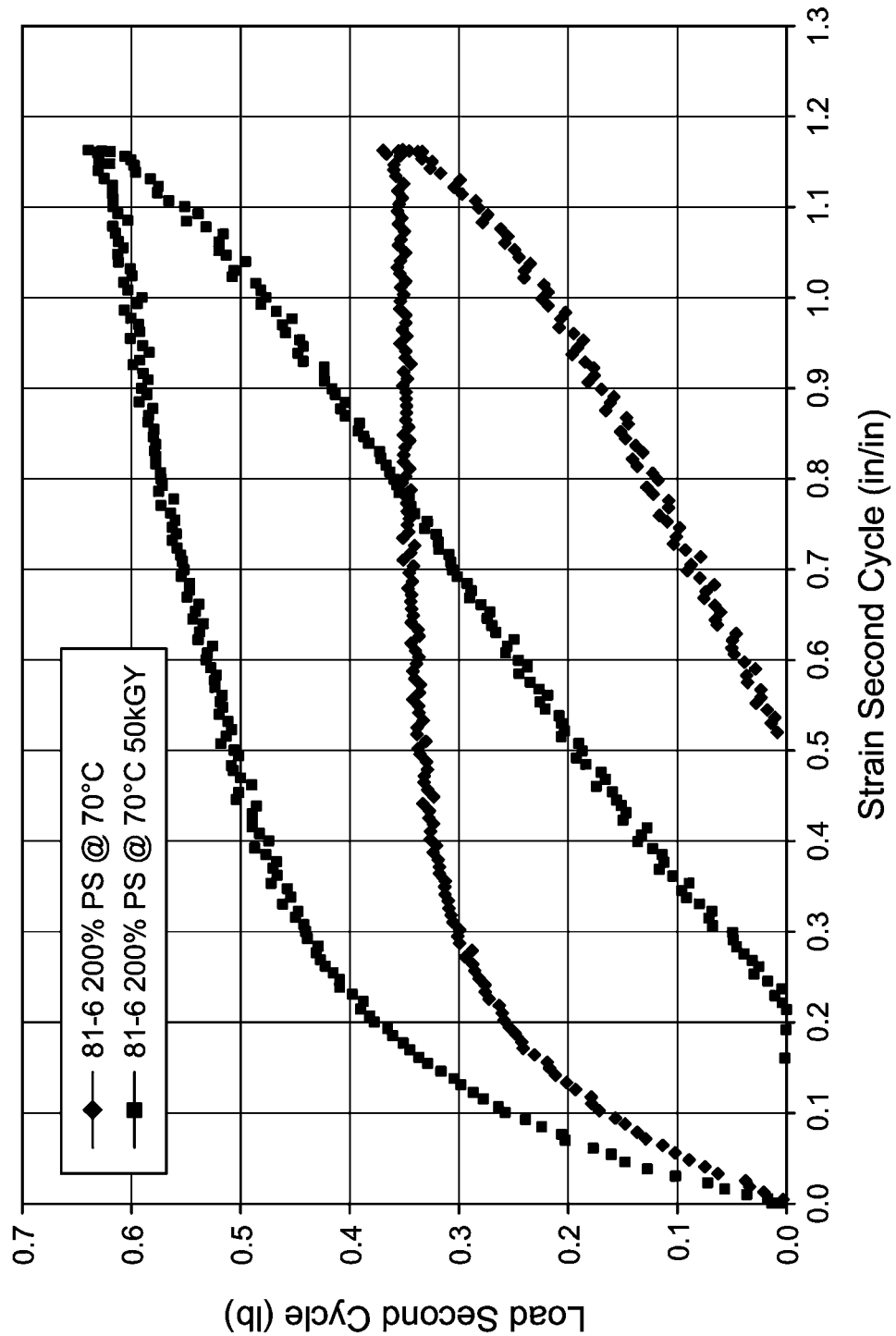
FIGS. 1 and 2 depict the improvement of Tension Set at 70° C. of the inventive crosslinked compositions.

The present invention is directed to a composition comprising one or more propylene-based polymers substantially lacking of diene-derived units, one or more co-agents, and one or more antioxidants and a crosslinked composition. In some embodiments of the invention, the propylene-based polymer can be polymer blends of a first propylene-based polymer formed in a first reactor with a second propylene-based polymer produced in a second reactor. These polymer blends may be compounded with a variety of additional components including coagents, antioxidants, secondary elastomers, polypropylene, additives, fillers, and additive oils, among others. In some embodiments, crosslinking of the propylene-based polymer, including the polymer blends, is accomplished via electron beam radiation. In particular, when propylene-based polymer, including the polymer blends described herein, are compounded with a coagent, an antioxidant, and/or UV sensitizer and subsequently crosslinked, they are expected to have improved properties such as peak stress, peak elongation, and tension set when compared to crosslinked polymer blends prepared in the same manner and having similar compositions but substantially lacking the coagent, antioxidant, and/or UV stabilizer. The compositions and methods for their production are described in greater detail below.

Propylene-Based Polymer

The propylene-based polymer can be one or more propylene-α-olefin copolymers. The terms "propylene-based polymer" as used herein will refer to propylene-α-olefin copolymers. The propylene-based polymer of the invention comprises less than 0.1 wt. % based on the weight of propylene-based polymer. For simplicity the term "substantially lack(ing)" as used herein refers to that the amount of the diene-derived units is less than 0.1 wt. % based on the total weight of the propylene-based polymer, preferably less than 0.05 wt. %, more preferably less than 0.01 wt. %, and most preferably equal to 0 wt. %.

As used herein, the term "copolymer" is intended to mean a material which is prepared by copolymerizing at least two different co-monomer types, including co-monomers derived from ethylene or higher α-olefins, such as $C_4$-$C_{20}$ α-olefins. One or more other different co-monomer types may also be included in the copolymer such that the copolymer definition includes terpolymers as well as copolymers comprising four or more different comonomer types. The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, and ethylene monomers.

In some embodiments, the propylene-based polymer can be prepared by polymerizing propylene with ethylene, or at least one $C_4$-$C_{20}$ α-olefin, or a combination of ethylene and at least one $C_4$-$C_{20}$ α-olefin. Preferred methods and catalysts for producing the propylene-based polymers are found in U.S. Publication Nos. 2004/0236042, WO 05/049672, and U.S. Pat. No. 6,881,800, all of which are incorporated herein by reference. Pyridine amine complexes, such as those described in WO03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP 1070087. The catalyst described in EP 1614699 could also be used for the production of backbones suitable for the invention. In one or more embodiments, the propylene-based polymer can comprise a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

The propylene-based polymer can have an average propylene (or propylene-derived units) content on a weight percent basis of from about 60 wt. % to about 99.7 wt. %, more preferably from about 65 wt. % to about 99.5 wt. %, more preferably from about 75 wt. % to about 99 wt. %, more preferably from about 75 wt. % to about 95 wt. % based on the weight of the propylene-based polymer. In one embodiment, the balance comprises diene. In another embodiment, the balance comprises one or more dienes and one or more of the α-olefins described previously. Other preferred ranges are from about 80 wt. % to about 95 wt. % propylene, more preferably from about 83 wt. % to about 95 wt. % propylene, more preferably from about 84 wt. % to about 95 wt. % propylene, and more preferably from about 84 wt. % to about 94 wt. % propylene based on the weight of the propylene-based polymer. The balance of the propylene-based polymer comprises one or more alpha-olefins. In one or more embodiments above or elsewhere herein, the alpha-olefin is ethylene, butene, hexene or octene. In other embodiments, two alpha-olefins are present, preferably ethylene and one of butene, hexene or octene.

Preferably, the propylene-based polymer of the present invention substantially lacks diene-derived units. That is, the propylene-based polymer comprises less than 0.1 wt. % of diene-derived units based on the weight of the propylene-based polymer, more preferably less than 0.05 wt. %, more preferably about 0.03 wt. %, even more preferably about 0.01 wt. %, and most preferably 0 wt. %. The term "diene" as used herein is defined as a hydrocarbon compound that has two unsaturation sites, i.e., a compound having two double bonds connecting carbon atoms. Exemplary dienes suitable for use in the present invention include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cycloalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In one or more embodiments, the diene is ENB.

In other embodiments, the propylene-based polymer preferably comprises propylene and one or more C2 and/or C4-C20 olefins. In general, this will amount to the propylene-based polymer preferably comprising from about 0.3 to about 40 wt. % of one or more C2 and/or C4-C20 olefins based the weight of the polymer. When C2 and/or C4-C20 olefins are present, the combined amount of these olefin-derived units in the polymer is preferably at least about 1 wt. % and falling within the ranges described herein. Other preferred ranges for the ethylene and/or one or more α-olefins include from about 0.5 wt. % to about 30 wt. %, more preferably from about 1 wt. % to about 25 wt. %, more preferably from about 5 wt. % to about 25 wt. %, more preferably from about 5 wt. % to about 20 wt. %, more preferably from about 5 wt. % to about 17 wt. % and more preferably from about 5 wt. % to about 16 wt. %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment, the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of U.S. practice, and references cited therein, and in accordance with the procedures disclosed in U.S. Pat. No. 6,525,157, Column 5, Lines 1-44, which patent is hereby incorporated by reference in its entirety.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = KMv^\alpha$, K and $\alpha$ are measured values for linear polymers and should be obtained on the same instrument as the one used for the g' index measurement.

In one or more embodiments above or elsewhere herein, the propylene-based polymer can have a density of about 0.85 g/cm$^3$ to about 0.92 g/cm$^3$, more preferably, about 0.87 g/cm$^3$ to 0.90 g/cm$^3$, more preferably about 0.88 g/cm$^3$ to about 0.89 g/cm$^3$ at room temperature as measured per the ASTM D-1505 test method.

In one or more embodiments above or elsewhere herein, the propylene-based polymer can have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min, more preferably 10 g/10 min to about 25 g/10 min, or more preferably 2 g/10 min to about 10 g/10 min.

The propylene-based polymer can have a Mooney viscosity ML (1+4)@125° C., as determined according to ASTM D1646, of less than 100, more preferably less than 75, even more preferably less than 60, most preferably less than 30.

In one or more embodiments above or elsewhere herein, the propylene-based polymer can have a heat of fusion (Hf) determined according to the DSC procedure described later, which is greater than or equal to about 0.5 Joules per gram (J/g), and is ≤about 80 J/g, preferably ≤about 75 J/g, preferably ≤about 70 J/g, more preferably ≤about 60 J/g, more preferably ≤about 50 J/g, more preferably ≤about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion is from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer can also be expressed in terms of percentage of crystallinity (i.e. % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 209 J/g).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to baseline as described herein) being considered the melting point of the propylene-based polymer.

The propylene-based polymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}C$ NMR of 75% or greater, 80% or greater, 82% or greater, 85% or greater, or 90% or greater. Preferred ranges include from about 50% to about 99%, more preferably from about 60% to about 99%, more preferably from about 75% to about 99% and more preferably from about 80% to about 99%; and in other embodiments from about 60% to about 97%. Triad tacticity is determined by the methods described in U.S. Publication No. 2004/0236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1233191, and U.S. Pat. No. 6,525,157, along with suitable propylene homo- and copolymers described in U.S. Pat. No. 6,770,713 and U.S. Patent Application Publication 2005/215964, all of which are incorporated by reference. The propylene-based polymer can also include one or more polymers consistent with those described in EP 1614699 or EP 1017729.

Polymer Blend

In one or more embodiments, the propylene-based polymer can comprise a polymer blend of two propylene-based polymers ("first polymer" and "second polymer") differing in the olefin content and substantially lacking diene-derived units.

In some embodiments of the present invention, the first and second polymers are each a copolymer of propylene and one or more comonomers. The comonomers may be linear or branched. In one or more embodiments, linear comonomers may include ethylene or $C_4$ to $C_8$ α-olefins, including but not limited to 1-butene, 1-hexene, and 1-octene. Branched comonomers may include 4-methyl-1-pentene, 3-methyl-1-pentene, and 3,5,5-trimethyl-1-hexene. In one or more embodiments, the comonomer can include styrene.

In some embodiments, the first and second polymers are each a copolymer of propylene and ethylene (and may comprise other comonomers as well). For example, the first and second polymers may be the same or different, and may each comprise from about 75 wt. % to about 99 wt. % units derived from propylene and from about 1 wt. % to about 25 wt. % units derived from ethylene. In some embodiments, the first polymer may comprise from about 12 wt. % to about 20 wt. % ethylene-derived units, or from about 14 wt. % to about 18 wt. % ethylene-derived units. In the same or other embodiments, the second polymer may comprise from about 3 wt. % to about 10 wt. % ethylene-derived units, or from about 5 wt. % to about 8 wt. % ethylene-derived units. In one embodiment of the present invention, the first polymer has greater ethylene content than the second polymer. For example, the first polymer may comprise at least 3 wt. %, or at least 5 wt. %, or at least 7 wt. %, or at least 9 wt. % more ethylene-derived units than the second polymer. In the same or other embodiment, the polymer blend comprises from about 1 wt. % to about 25 wt. %, from about 5 wt. % to about 20 wt. %, or from about 10 wt. % to about 18 wt. % ethylene-derived units based on the weight of the polymer blend.

In one or more embodiments herein, the second polymer may alternately comprise lower amounts of ethylene, or no ethylene at all, such that the second polymer may be homopolypropylene or a random copolymer of polypropylene (RCP). Exemplary RCPs typically comprise from about 1 wt. % to about 8 wt. % comonomer, or from about 2 to about 5 wt. % comonomer. In one or more embodiments, the RCP comonomer is ethylene.

In one or more embodiments, the first and second polymers may have a weight average molecular weight (Mw) of 5,000,000 g/mole or less, a number average molecular weight (Mn) of about 3,000,000 g/mole or less, a z-average molecular weight (Mz) of about 10,000,000 g/mole or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D.

In one or more embodiments, the first and second polymers have the same or different Mw, and each have an Mw of about 5,000 to about 5,000,000 g/mole, or an Mw of about 10,000 to about 1,000,000, or an Mw of about 20,000 to about 500,000, or an Mw of about 50,000 to about 400,000, where Mw is determined as described herein.

In one or more embodiments, the first and second polymers may have the same or different Mn, and each have an Mn of about 2,500 to about 2,500,000 g/mole, or an Mn of about 5,000 to about 500,000, or an Mn of about 10,000 to about 250,000, or an Mn of about 25,000 to about 200,000, where Mn is determined as described herein.

In one or more embodiments, the first and second polymers have the same or different Mz, and each have an Mz of about 10,000 to about 7,000,000 g/mole, or an Mz of about 50,000 to about 1,000,000, or an Mz of about 80,000 to about 700,000, or an Mz of about 100,000 to about 500,000, where Mz is determined as described herein.

In some embodiment the MWD can have an upper limit of 40, or 20, or 10, or 5, or 4.5, and a lower limit of 1.5, or 1.8, or 2.0. In one or more embodiments, the MWD of the first polymer or the second polymer or both is about 1.8 to 5. Method of determination of molecular weight and molecular weight distribution is as aforementioned.

In one or more embodiments, the first and second polymers may have a g' index value of 0.95 or greater, or at least 0.97, or at least 0.99, wherein g' index is measured at the Mw of the polymer using the intrinsic viscosity of isotactic polypropylene as the baseline, as mentioned above.

In one or more embodiments, the first and second polymers may have the same or different density, which may be from about 0.85 g/cm$^3$ to about 0.92 g/cm$^3$, or from about 0.87 g/cm$^3$ to 0.90 g/cm$^3$, or from about 0.88 g/cm$^3$ to about 0.89 g/cm$^3$ at room temperature as measured per the ASTM D-1505 test method.

In one or more embodiments, the first and second polymers can have a melt flow rate (MFR, 2.16 kg weight @ 230° C.) greater than or equal to 0.2 g/10 min as measured according to the ASTM D-1238(A) test method. The MFR of the first and second polymers can be the same or different. In some embodiments, the MFR (2.16 kg @ 230° C.) of the first polymer or the second polymer or both is from about 0.5 g/10 min to about 200 g/10 min, or from about 1 g/10 min to about 100 g/10 min. In some embodiments, the first and/or second polymers have an MFR of from about 0.5 g/10 min to about 200 g/10 min, or from about 2 g/10 min to about 30 g/10 min, or from about 5 g/10 min to about 30 g/10 min, or from about 10 g/10 min to about 30 g/10 min, or from about 10 g/10 min to about 25 g/10 min, or from about 2 g/10 min to about 10 g/10 min.

The first and/or second polymers may have a Mooney viscosity, ML (1+4)@125° C., as determined according to ASTM D1646, of less than 100, or less than 75, or less than 60, or less than 30. The Mooney viscosity of the first and second polymers may be the same or different.

In one or more embodiments, the first polymer or second polymer or both may have a heat of fusion (Hf) determined according to the DSC procedure described later, which is greater than or equal to about 0.5 Joules per gram (J/g), and is less than or equal to about 80 J/g, or less than or equal to about 75 J/g, or less than or equal to about 70 J/g, or less than or equal to about 60 J/g, or less than or equal to about 50 J/g. The first polymer or second polymer or both may also have a heat of fusion that is greater than or equal to about 1 J/g, or greater than or equal to about 5 J/g. In another embodiment, the first polymer or second polymer or both may have a heat of fusion (Hf) which is from about 0.5 J/g to about 75 J/g, or from about 1 J/g to about 75 J/g, or from about 3 J/g to about 35 J/g. In some embodiments, the first and second polymers can be characterized in terms of both their melting points (Tm) and heats of fusion, which properties can be influenced by the presence of comonomers or steric irregularities that hinder the formation of crystallites by the polymer chains. In one or more embodiments, the heat of fusion of the first polymer or the second polymer or both ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g. The heat of fusion of the first and second polymers may be the same or different.

The crystallinity of the first and second polymers can also be expressed in terms of percentage of crystallinity (i.e., % crystallinity). In one or more embodiments, the first polymer and second polymers have the same or different crystallinity, and the % crystallinity of one or both of the polymers may be from 0.5% to 40%, or from 1% to 30%, or from 5% to 25%, where % crystallinity is determined according to the DSC procedure described above.

The first and second polymers may have the same or different melting point, and, in some embodiments, one or both of the first and second polymers, has a melting point (measured by DSC) of equal to or less than 110° C., or less than 100° C., or less than 90° C., or less than or equal to 80, or less than or equal to 75° C., or from about 25° C. to about 80° C., or from about 25° C. to about 75° C., or from about 30° C. to about 65° C. In one or more embodiments, the melting point of the second polymer is greater than the melting point of the first polymer, and may be greater than about 105° C., or greater than about 110° C., or greater than about 115° C.

The first and/or second polymers may further have a triad tacticity of three propylene units, as measured by $^{13}$C NMR, of 75% or greater, 80% or greater, 82% or greater, 85% or greater, or 90% or greater. In some embodiments, the triad tacticity of the first polymer, the second polymer, or both ranges from about 50 to about 99%, or from about 60 to about 99%, or from about 75 to about 99%, or from about 80 to about 99%, or from about 60 to about 97%. Triad tacticity can be determined as aforementioned.

Preparation of the Polymer Blend

Particles made from polymers of the type described herein are generally soft to the touch and may be tacky. While these properties are desirable for many end-use applications, the polymers may present storage and handling problems. For example, polymer particles, such as those made from a pelletization process, made from these polymers have a tendency to agglomerate (or exhibit restricted flow), particularly after long-term warehouse storage at ambient temperatures.

It has been discovered that agglomeration of these pellets results from deformation of the polymer pellets during storage and handling of the pellets during the first few hours or days following production of the pellets. Specifically, upon production, polymer pellets generally have shapes that are spherical, cylindrical, disk-like, or other shapes in which the outer surface of the pellets are curved as opposed to flat surfaces. Generally, polymer pellets are free-flowing, as the curved surfaces of the pellets have minimal contact surface and thus slide freely past each other. However, it has been discovered that under certain circumstances, the curved pellet surfaces may become flattened during storage as a result of the pellets pressing against each other, especially when stored in containers with significant vertical dimensions. When this flattening of the surfaces of the polymer pellets occurs, contact area increases significantly, reducing the ability of the pellet surfaces to slide past each other, leading to agglomeration or restricted flow of the particles in subsequent processing steps.

By increasing the rate of crystallization, flattening of the surfaces of the pellets is less likely to occur and the pellets can become hard in the course of conventional polymer finishing steps to provide free-flowing pellets, even after the pellets are stored for long periods of time at high ambient temperatures.

The resistance of a pellet to flattening of its surfaces is related to the level of crystallization of the polymers and may be determined by measuring the hardness of the polymer pellets. Generally, it has been determined, in one embodiment, that a Shore A Hardness (ASTM 2240) of at least 50 provides pellets with a reduced tendency to agglomerate. In another embodiment, a Shore A Hardness of at least 55 provides pellets with a reduced tendency to agglomerate. In a further embodiment, a shore A Hardness of at least 60 provides pellets with a reduced tendency to agglomerate. While pellets made from many low crystallinity polymers may achieve this level of hardness following production, it may take days before this level of hardness is attained as the pellets crystallize slowly over time, particularly for propylene-based polymers and copolymers where crystallization kinetics are known to be slower than ethylene-based polymers and copolymers. The processes described herein are believed to speed the rate of crystallization of the polymer pellets to provide hardness, in a short period of time after production, which enables the pellets to flow freely, even after long storage periods.

In certain embodiments of the processes and blends described herein, a first polymer is blended with a second polymer to produce a polymer blend that, when processed into pellet forms, will achieve a state of crystallization sufficient to provide a Shore A hardness of at least 50, or at least 52, or at least 55, or at least 57, or at least 60, in a relatively short period time (i.e., within 40 minutes after initial cooling of the pellets, or within 30 minutes, or within 20 minutes, or within 15 minutes), as compared to pellets produced from the first polymer alone.

For purposes of this disclosure, the first polymer, as described above, may generally be considered a low crystallinity polymer, while the second polymer, as described above, may generally be considered a high crystallinity polymer. It has been discovered that the agglomeration tendencies of pellets made from low crystallinity polymers may be reduced or eliminated by blending the low crystallinity polymer with at least one high crystallinity polymer incorporating propylene-derived units having high crystallinity. For purposes of this disclosure, a high crystallinity polymer incorporating propylene-derived units means a polymer incorporating at least 90 wt. % of propylene derived units and having a melt temperature of at least 100° C.

In certain embodiments of the processes and blends described herein, solutions of a first low crystallinity polymer and a second high crystallinity polymer are blended via a process which produces the polymers in separate series or parallel polymerization stages. For example, the first low crystallinity polymer may be produced in a first reactor. An effluent from the first reactor, containing a solution of the first polymer, is transferred to a second reactor where a catalyst and monomers necessary to produce the second high crystallinity polymer are contacted, so that a solution of the second polymer is produced in the second reactor and in the presence of the first polymer. This is referred to as a series reactor process.

Both the first polymer and the second polymer may be produced in solution polymerization reactors. Combining the solutions of the polymeric components resulting from these processes provides an intimate blending of the first and second polymers during polymerization of the second copolymer. The blended polymers may then be withdrawn from the second reactor and processed into polymer particles, fibers, films, nonwovens, or other finished articles using conventional processing equipment and techniques.

Alternatively, the first low crystallinity polymer may be produced in the first reactor in parallel with the second high crystallinity polymer produced in the second reactor. In parallel polymerization processes, the first and second polymers are produced in parallel reactors with effluents from each reactor, containing solutions of the respective polymer, directed to a device for blending the effluents to produce a solution of blended polymer components. The blended polymers are then recovered from the solution and processed into polymer particles, fibers, films, nonwovens, or other finished articles in accordance with conventional process equipment and techniques.

More detailed descriptions of both series and parallel processes suitable for production of the polymer blends described herein, including polymerization conditions and suitable catalysts for use therein, are found in U.S. Publication No. 2004/0024146 and U.S. Publication No. 2006/0183861, both of which are incorporated by reference herein in their entireties.

In alternate embodiments of the present invention, the first and second polymers may be produced in high pressure solution processes. Such processes, including polymerization conditions and suitable catalysts for use therein, are described in more detail in U.S. Publication No. 2009/0163642, which is incorporated by reference herein in its entirety.

In some embodiments of the present invention, polymer blends of the invention are produced by polymerizing a polymer solution comprising a first polymer in a first reactor, polymerizing a polymer solution comprising a second polymer in a second reactor, combining the first polymer solution with the second polymer solution to produce a polymer blend solution, and processing the polymer blend solution to produce a polymer blend.

Properties of the Polymer Blend

In certain embodiments of the present invention, the polymer blends produced by the dual reactor process described above may incorporate, in neat form, from about 45 wt. % to about 98 wt. %, or from about 50 wt. % to about 98 wt. %, or from about 60 wt. % to about 98 wt. %, or from about 70 wt. % to about 98 wt. % of the first polymer and from about 2 wt. % to about 55 wt. %, or from about 2 wt. % to about 50 wt. %, or from about 2 wt. % to about 40 wt. %, or from about 2 wt. % to about 30 wt. % of the second polymer. In another embodiment, in neat form, the polymer blends described herein incorporate from about 80 wt. % to about 95 wt. % of the first polymer and from about 5 wt. % to about 20 wt. % of the second polymer. In other embodiments, in neat form, the polymer blends described herein incorporate from about 90 wt. % to about 95 wt. % of the first polymer and from about 5 wt. % to about 10 wt. % of the second polymer.

In further embodiments of the invention, the polymer blends may comprise an overall ethylene content of from about 10 wt. % to about 18 wt. %, or from about 12 wt. % to about 16 wt. % ethylene.

In some embodiments, the polymer blends described herein may have a melt flow rate (MFR, 2.16 kg weight @ 230° C.) of from about 1 to about 30 g/10 min, as measured according to the ASTM D-1238(A) test method. In further embodiments, the MFR of the blend is from about 3 to about 7 g/10 min.

In some embodiments, the polymer blends may have an Mn of from about 10,000 to about 200,000 g/mole, or from about 20,000 to about 150,000, or from about 30,000 to about 100,000. In the same or other embodiments, the polymer blends may have an Mw of from about 100,000 to about 400,000 g/mole, or from about 150,000 to about 300,000, or from about 200,000 to about 250,000. The polymer blends may also have an MWD of from about 1.5 to about 10, or from about 2.0 to about 4.0. In addition, the polymer blends may have a g' index of from about 0.94 to about 0.99, or from about 0.95 to about 0.98.

The polymer blends described herein may, in some embodiments, have a melting point greater than about 100° C., or greater than about 110° C., or greater than about 115° C. In addition, the heat of fusion of the polymer blends may be less than about 30 J/g, or less than about 25 J/g, or less than about 20 J/g. In some embodiments of the present invention, the polymer blends prepared in dual reactors as described above have a melting point that is at least about 5° C. greater, or at least about 10° C. greater, than the melting point of a polymer blend having the same overall composition but prepared by physically blending the first and second polymers rather than by reactor blending.

Grafted (Functionalized) Backbone

In one or more embodiments, the propylene-based polymer can be grafted (i.e., "functionalized") using one or more grafting monomers. As used herein, the term "grafting" denotes covalent bonding of the grafting monomer to a polymer chain of the propylene-based polymer.

The grafting monomer can be or include at least one ethylenically unsaturated carboxylic acid or acid derivative, such as an acid anhydride, ester, salt, amide, imide, acrylates, or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer comprises from about 0.5 to about 10 wt. % ethylenically unsaturated carboxylic acid or acid derivative, more preferably from about 0.5 to about 6 wt. %, more preferably from about 0.5 to about 3 wt. %; in other embodiments from about 1 to about 6 wt. %, more preferably from about 1 to about 3 wt. %. In a preferred embodiment wherein the graft monomer is maleic anhydride, the maleic anhydride concentration in the grafted polymer is preferably in the range of about 1 to about 6 wt. %, preferably at least about 0.5 wt. % and highly preferably about 1.5 wt. %.

Styrene and derivatives thereof, such as paramethyl styrene, or other higher alkyl substituted styrenes, such as t-butyl styrene, can be used as a charge transfer agent in presence of the grafting monomer to inhibit chain scissioning. This allows further minimization of the beta scission reaction and the production of a higher molecular weight grafted polymer (MFR=1.5).

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw, preferably twin screw extruder reactors, such as co-rotating intermeshing extruder, or counter-rotating non-intermeshing extruders but also co-kneaders, such as those sold by Buss, are especially preferred.

In one or more embodiments, the grafted polymer can be prepared by melt blending the ungrafted propylene-based polymer with a free radical generating catalyst, such as a peroxide initiator, in the presence of the grafting monomer.

The preferred sequence for the grafting reaction includes melting the propylene-based polymer, adding and dispersing the grafting monomer, introducing the peroxide and venting the unreacted monomer and by-products resulting from the peroxide decomposition. Other sequences can include feeding the monomers and the peroxide pre-dissolved in a solvent.

Illustrative peroxide initiator include but are not limited to: diacyl peroxides such as benzoyl peroxide; peroxyesters such as tert-butylperoxy benzoate, tert-butylperoxy acetate, OO-tert-butyl-O-(2-ethylhexyl)monoperoxy carbonate; peroxyketals such as n-butyl-4,4-di-(tert-butyl peroxy) valerate; and dialkyl peroxides such as 1,1-bis(tertbutylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, Di-(2-tert-butylperoxy-isopropyl-(2)) benzene, di-tert-butylperoxide (DTBP), 2,5-dimethyl-2,5-di (tert-butylperoxy)hexane, 2,5-dimethyl-2,5-di(tert-butylperoxy)hexyne, 3,3,5,7,7-pentamethyl 1,2,4-trioxepane; and the like.

Composition

In some embodiments of the present invention, the propylene-based polymers, including the polymer blends described herein, may be compounded with one or more additional components. Additional components suitable for compounding with the polymer blend are well known to persons of skill in the art and may include, but are not limited to, coagents, antioxidants, secondary elastomers, polyolefinic thermoplastic resins, such as polypropylene, additives, fillers, and additive oils. In further embodiments, the propylene-based polymers, including the polymer blends, are compounded with at least one or more coagents or one or more antioxidants, with or without other additional components. In certain embodiments, the propylene-based polymers, including the polymer blends described herein, are compounded with both a coagent and an antioxidant.

In one or more embodiments, the individual materials and components, such as the propylene-based polymers, including the polymer blends described herein, and optionally the one or more coagents, antioxidants, secondary elastomers, polyolefinic thermoplastics, such as polypropylene, additives, fillers, and/or additive oils may be blended by melt-mixing to form a composition. Examples of machinery capable of generating the required shear and mixing for compounding include extruders with kneaders or mixing elements with one or more mixing tips or flights, extruders with one or more screws, extruders of co or counter rotating type, Banbury mixers, Farrell Continuous mixers, and Buss Kneaders. The type and intensity of mixing, temperature, and residence time required can be achieved by the choice of one of the above machines in combination with the selection of kneading or mixing elements, screw design, and screw speed (<3000 RPM).

In one or more embodiments, the coagents, antioxidants, and/or other additives can be introduced at the same time as the other polymer components or later downstream, in the case of using an extruder or Buss kneader, or only later in time. In further embodiments, when polymer blends described herein are used, the coagents, antioxidants, and/or other additives may be incorporated into the polymer product by in-line compounding, in which the additives are introduced into the second reactor at the time the second polymer is formed. This eliminates the need for additional compounding steps and equipment. In addition to the coagents and antioxidants described, other additives can include, but are not limited to, antiblocking agents, antistatic agents, ultraviolet stabilizers, pigments, coloring agents, nucleating agents, fire or flame retardants, plasticizers, vulcanizing or curative agents, vulcanizing or curative accelerators, tackifiers, flow improvers, lubricants, mold release agents, foaming agents, reinforcers, and processing aids. The additives can be added to the blend in pure form or in master batches. Fillers suitable for use in the compounded polymer blends of the present invention are well known in the art and may include granular, fibrous, and powder-like fillers. Particular fillers which may be suitable for use in the present invention include natural and synthetic clays, carbon black, and diatomaceous earth, among others.

Illustrative ingredients that may be included in the composition are set forth in greater detail below, but persons of skill in the art will recognize that the following description is not inclusive, and that any material suitable for compounding with the polymer blends described herein may be employed.

Coagents

The composition of the present invention can optionally include one or more coagents. Suitable coagents may include liquid and metallic multifunctional acrylates and methacrylates, functionalized polybutadiene resins, functionalized cyanurate, and allyl isocyanurate. More particularly, suitable coagents can include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate, azobisisobutyronitrile and the like, and combinations thereof. In one or more embodiments, suitable coagents include triacrylates, and in a particular embodiment the coagent is trimethylolpropane trimethacrylate. Commercially available coagents may be purchased from, for example, Sartomer. An exemplary coagent is Sartomer 350.

In one or more embodiments, the polymer blends contain at least 0.1 wt. % of coagent based on the total weight of blend. In one or more embodiments, the amount of coagent(s) can range from about 0.1 wt. % to about 15 wt. %, based on the weight of blend. In one or more embodiments, the amount of coagent(s) can range from a low of about 0.1 wt. %, or about 0.5 wt. %, or about 1 wt. %, or about 1.5 wt. %, or about 2 wt. % to a high of about 4 wt. %, or about 5 wt. %, or about 7 wt. %, or about 10 wt. %, or about 15 wt. %, based on the weight of the composition. In further embodiments, the amount of coagent(s) is from about 3 wt. % to about 6% based on the total weight of the composition.

Antioxidants

The composition of the present invention may optionally include one or more anti-oxidants. Examples of antioxidants include, but are not limited to quinolein, e.g., trimethylhydroxyquinolein (TMQ); imidazole, e.g., zincmercapto toluoyl imidazole (ZMTI); and conventional antioxidants, such as hindered phenols, lactones, phosphates, and hindered amines. Further suitable anti-oxidants are commercially available from, for example, Ciba Geigy Corp. under the tradenames Irgafos 168, Irganox 1010, Irganox 3790, Irganox B225, Irganox 1035, Irgafos 126, Irgastab 410, and Chimassorb 944. In one or more embodiments, the antioxidant comprises a phosphite ester, and may particularly be tris-(2,4-di-tert-butylphenyl)phosphite. The one or more antioxidants may be added to the polymer blends to protect against degradation during shaping or fabrication operations and/or to better control the extent of chain degradation.

In one or more embodiments, the compositions contain at least 0.1 wt. % of antioxidant, based on the total weight of blend. In one or more embodiments, the amount of antioxidant(s) can range from about 0.1 wt. % to about 5 wt. %, based on the total weight of blend. In other embodiments, the amount of antioxidant(s) can range from a low of about 0.1 wt. %, 0.15 wt. % or 0.2 wt. % to a high of about 1 wt. %, 2.5 wt. %, or 5 wt. %, based on the total weight of blend. In further embodiments, the amount of antioxidant(s) is from about 0.2 wt. % to about 6 wt. %, based on the total weight of the composition.

Secondary Elastomers

The polymer blends of the present invention can optionally include one or more secondary elastomers. In at least one specific embodiment, the secondary elastomer can be or include one or more ethylene-propylene copolymers (EP). Preferably, the ethylene-propylene polymer (EP) is non-crystalline, e.g., atactic or amorphous, but in certain embodiments the EP may be crystalline (including "semi-crystalline"). The crystallinity of the EP is preferably derived from the ethylene, and a number of published methods, procedures and techniques are available for evaluating whether the crystallinity of a particular material is derived from ethylene. The crystallinity of the EP can be distinguished from the crystallinity of the propylene-based polymer by removing the EP from the composition and then measuring the crystallinity of the residual propylene-based polymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

In one or more embodiments, the EP can include one or more optional polyenes, including particularly a diene; thus, the EP can be an ethylene-propylene-diene terpolymer (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of EP or EPDM copolymers include those that are available under the trade name Vistalon from ExxonMobil Chemicals. Several commercial EPDMs are available from DOW under the tradenames Nordel IP and MG. Certain rubber components (e.g., EPDMs, such as Vistalon 3666) include additive oil that is preblended before the rubber component is combined with the thermoplastic. The type of additive oil utilized will be that customarily used in conjunction with a particular rubber component.

Examples of the optional polyenes include, but are not limited to, butadiene; pentadiene; hexadiene (e.g., 1,4-hexadiene); heptadiene (e.g., 1,6-heptadiene); octadiene (e.g., 1,7-octadiene); nonadiene (e.g., 1,8-nonadiene); decadiene (e.g., 1,9-decadiene); undecadiene (e.g., 1,10-undecadiene); dodecadiene (e.g., 1,11-dodecadiene); tridecadiene (e.g., 1,12-tridecadiene); tetradecadiene (e.g., 1,13-tetradecadiene); pentadecadiene; hexadecadiene; heptadecadiene; octadecadiene; nonadecadiene; icosadiene; heneicosadiene; docosadiene; tricosadiene; tetracosadiene; pentacosadiene; hexacosadiene; heptacosadiene; octacosadiene; nonacosadiene; triacontadiene; and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene;

dicyclopentadiene; bicyclo(2.2.1)hepta-2,5-diene; and alkenyl-; alkylidene-; cycloalkenyl-; and cylcoalkyliene norbornenes [including, e.g., 5-methylene-2-norbornene; 5-ethylidene-2-norbornene; 5-propenyl-2-norbornene; 5-isopropylidene-2-norbornene; 5-(4-cyclopentenyl)-2-norbornene; 5-cyclohexylidene-2-norbornene; and 5-vinyl-2-norbornene]. Examples of cycloalkenyl-substituted alkenes include, but are not limited to vinyl cyclohexene; allyl cyclohexene; vinylcyclooctene; 4-vinylcyclohexene; allyl cyclodecene; vinylcyclododecene; and tetracyclododecadiene.

In another embodiment, the secondary elastomer can include, but is not limited to, styrene/butadiene rubber (SBR); styrene/isoprene rubber (SIR); styrene/isoprene/butadiene rubber (SIBR); styrene-butadiene-styrene block copolymer (SBS); hydrogenated styrene-ethylene/butylene-styrene block copolymer (SEBS); hydrogenated styrene-ethylene block copolymer (SEB); styrene-isoprene-styrene block copolymer (SIS); styrene-isoprene block copolymer (SI); hydrogenated styrene-isoprene block copolymer (SEP); hydrogenated styrene-isoprene-styrene block copolymer (SEPS); styrene-ethylene/butylene-ethylene block copolymer (SEBE); styrene-ethylene-styrene block copolymer (SES); ethylene-ethylene/butylene block copolymer (EEB); ethylene-ethylene/butylene/styrene block copolymer (hydrogenated BR-SBR block copolymer); ethylene-ethylene/butylene-ethylene block copolymer (EEBE); ethylene-ethylene/alpha-olefin block copolymers; polyisoprene rubber; polybutadiene rubber; isoprene butadiene rubber (IBR); polysulfide; nitrile rubber; propylene oxide polymers; star-branched butyl rubber and halogenated star-branched butyl rubber; brominated butyl rubber; chlorinated butyl rubber; star-branched polyisobutylene rubber; star-branched brominated butyl(polyisobutylene/isoprene copolymer) rubber; poly(isobutylene-co-alkylstyrene); preferably isobutylene/methylstyrene copolymers such as isobutylene/meta-bromomethylstyrene; isobutylene/bromomethylstyrene; isobutylene/chloromethylstyrene; halogenated isobutylene cyclopentadiene; and isobutylene/chloromethylstyrene, and mixtures thereof. Preferred secondary elastomers include hydrogenated styrene-ethylene/butylene-styrene block copolymer (SEBS), and hydrogenated styrene-isoprene-styrene block copolymer (SEPS).

The secondary elastomer can also be or include natural rubber. Natural rubbers are described in detail by *Subramaniam* in RUBBER TECHNOLOGY, pp. 179-208 (1995). Suitable natural rubbers may be Malaysian rubbers such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

The secondary elastomer can also be or include one or more synthetic rubbers. Suitable commercially available synthetic rubbers include NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product is BUDENE™ 1207.

The secondary elastomer can be present in an amount of up to 50 phr in one embodiment, or up to 40 phr in another embodiment, or up to 30 phr in yet another embodiment. In one or more embodiments, the amount of the secondary elastomer can range from a low of about 1, 7, or 20 phr to a high of about 25, 35, or 50 phr.

Polyolefinic Thermoplastic Resin

The composition can further comprise, in addition to the propylene-based polymer or polymer blends described herein, a polyolefinic thermoplastic resin. The term "polyolefinic thermoplastic resin" as used herein refers to any material that is not a rubber and that is a polymer or polymer blend having a melting point of 70° C. or more and considered by persons skilled in the art as being thermoplastic in nature, e.g., a polymer that softens when exposed to heat and returns to its original condition when cooled to room temperature. The polyolefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin is unvulcanized or non-crosslinked.

In one or more embodiments, the polyolefinic thermoplastic resin described herein may contain additional amounts of polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt. % propylene units, and contains isotactic sequences of those units. The polypropylene can also include atactic sequences or syndiotactic sequences, or both. The polypropylene can also include syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or g/10 min to a high of 25 to 30 g/10 min) Others have a lower MFR, e.g., "fractional" polypropylenes which have an MFR less than 1.0. Those with high MFR may be preferred for ease of processing or compounding.

In one or more embodiments, the polyolefinic thermoplastic resin may include isotactic polypropylene. Preferably, the polyolefinic thermoplastic resin may contain one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers may have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a copolymer of propylene having up to 9 wt. %, preferably 2 wt. % to 8 wt. % of an alpha olefin comonomer.

Preferred alpha olefin comonomers have 2 carbon atoms, or from 4 to 12 carbon atoms. Preferably, the alpha olefin comonomer is ethylene.

In one or more embodiments, the random polypropylene may have a 1% secant modulus of about 100 kPsi to about 200 kPsi, as measured according to ASTM D790A. In one or more embodiments, the 1% secant modulus can be 140 kPsi to 170 kPsi, as measured according to ASTM D790A. In one or more embodiments, the 1% secant modulus can be 140 kPsi to 160 kPsi, as measured according to ASTM D790A. In one or more embodiments, the 1% secant modulus can range from a low of about 100, 110, or 125 kPsi to a high of about 145, 160, or 175 kPsi, as measured according to ASTM D790A.

In one or more embodiments, the random polypropylene can have a density of about 0.85 to about 0.95 g/cc, as measured by ASTM D792. In one or more embodiments, the random polypropylene can have a density of about 0.89 g/cc to 0.92 g/cc, as measured by ASTM D792. In one or more embodiments, the density can range from a low of about 0.85, 0.87, or 0.89 g/cc to a high of about 0.90, 0.91, 0.92 g/cc, as measured by ASTM D792.

Other polymers that may be included in the compositions of the invention include isotactic poly(1-butene), such as PB0110M available from Basell Polyolefins.

Additive Oil

The polymer blends described herein can also optionally include one or more additive oils. The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include mineral oil, alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectraSyn™ Escorez™ and Elevast™, all supplied by ExxonMobil Chemical Company).

The ordinarily skilled chemist will recognize which type of oil may be used with a particular composition, and will also be able to determine the suitable amount (quantity) of oil to be added. The additive oil can be present in amounts from about 5 to about 300 parts by weight per 100 parts by weight of the blend.

In some embodiments, the additive oil comprises a polybutene oil. Preferable polybutene oils have an Mn of less than 15,000, and include homopolymers or copolymers of olefin-derived units having from 3 to 8 carbon atoms and more preferably from 4 to 6 carbon atoms. In one or more embodiments, the polybutene is a homopolymer or copolymer of a $C_4$ raffinate. An embodiment of preferred low molecular weight polymers termed "polybutene" polymers is described in, for example, Synthetic Lubricants and High-Performance Functional Fluids, pp. 357-392 (Leslie R. Rudnick & Ronald L. Shubkin, ed., Marcel Dekker 1999) (hereinafter "polybutene processing oil" or "polybutene").

In one or more embodiments, the polybutene processing oil is a copolymer having at least isobutylene derived units, and optionally 1-butene derived units, and/or 2-butene derived units. In one embodiment, the polybutene is a homopolymer if isobutylene, or a copolymer of isobutylene and 1-butene or 2-butene, or a terpolymer of isobutylene and 1-butene and 2-butene, wherein the isobutylene derived units are from 40 wt. % to 100 wt. % of the copolymer, the 1-butene derived units are from 0 to 40 wt. % of the copolymer, and the 2-butene derived units are from 0 to 40 wt. % of the copolymer. In another embodiment, the polybutene is a copolymer or terpolymer wherein the isobutylene derived units are from 40 wt. % to 99 wt. % of the copolymer, the 1-butene derived units are from 2 wt. % to 40 wt. % of the copolymer, and the 2-butene derived units are from 0 wt. % to 30 wt. % of the copolymer. In yet another embodiment, the polybutene is a terpolymer of the three units, wherein the isobutylene derived units are from 40 wt. % to 96 wt. % of the copolymer, the 1-butene derived units are from 2 wt. % to 40 wt. % of the copolymer, and the 2-butene derived units are from 2 wt. % to 20 wt. % of the copolymer. In yet another embodiment, the polybutene is a homopolymer or copolymer of isobutylene and 1-butene, wherein the isobutylene derived units are from 65 wt. % to 100 wt. % of the homopolymer or copolymer, and the 1-butene derived units are from 0 to 35 wt. % of the copolymer. Commercial examples of suitable processing oil include the PARAPOL™ series of processing oils or polybutene grades or Indopol™ oils, from Soltex Synthetic Oils and Lubricants or from BP/Innovene.

In certain embodiments, the processing oil or oils can be present at from 1 to 60, or from 2 to 40, or from 4 to 35, or from 5 to 30 parts by weight per 100 parts by weight of the blend.

Applications

The composition may be formed or shaped into a wide variety of finished articles by finishing methods well known to those of skill in the art. Such articles may include, but are not limited to, films, fibers, yarns, nonwovens, coatings, molded articles, and the like. Finished articles may be formed by any suitable process, such as for example extrusion, blow molding, injection molding, meltblowing, spunbonding, compression molding, fiber spinning, and other processes known to those familiar with the art. The blends of the present invention are particularly useful in applications requiring stretchable elastic materials, such as in disposable diapers, training pants, incontinence pads, clothing, undergarments, sports apparel, automotive trim, weather-stripping, gaskets, and furniture upholstery, among others.

Crosslinking of Composition

The propylene-based polymer, including the polymer blend described herein, of the present invention, whether compounded as described above or not and whether formed into finished articles or not, may be at least partially crosslinked by a variety of methods known in the art. One such method for at least partially crosslinking the propylene-based polymer, including the polymer blend described herein or the composition is by exposing to energetic photons. In particular, crosslinking of the propylene-based polymer, including the polymer blend described herein or the composition may be accomplished by exposing to electromagnetic radiation having a frequency greater than that of visible light, such as for example near ultraviolet radiation, extreme ultraviolet radiation, soft x-rays, hard x-rays, gamma rays, and high-energy gamma rays. In certain embodiments of the present invention, where the propylene-based polymer is substantially lack of diene-derived units, crosslinking is accomplished by electron beam radiation.

Electron beam radiation is a form of ionizing energy that is generally is characterized by its low penetration and high dose rates. The electrons are generated by equipment referred to as accelerators which are capable of producing beams that are either pulsed or continuous. The term "beam" is meant to include any area exposed to electrons, which may range from a focused point to a broader area, such as a line or field. The electrons are produced by a series of cathodes (electrically heated tungsten filaments) that generate a high concentration of electrons. These electrons are then accelerated across a potential. The accelerating potential is typically in the keV to MeV range (where eV denotes electron volts), depending on the depth of penetration required. The irradiation dose is usually measured in Gray (unit) but also in rads, where 1 Gy is equivalent to 100 rad, or, more typically, 10 kGy equals 1 Mrad. Commercial electron beam units generally range in energies from 50 keV to greater than 10 MeV (million electron volts).

In one or more embodiments herein, the composition or articles comprising the propylene-based polymer, including polymer blend described herein, are at least partially crosslinked or cured so that they become heat-resistant. As used herein, the term "heat-resistant" refers to the ability of a polymer composition or an article formed from a polymer composition to pass the high temperature heat-setting tests described herein. As used herein, the terms "cured," "crosslinked," "at least partially cured," and "at least partially crosslinked" refer to a composition having at least 2 wt. % insolubles based on the total weight of the composition. In one or more embodiments, the compositions described herein can be cured to a degree so as to provide at least 3 wt. %, or at least 5 wt. %, or at least 10 wt. %, or at least 20 wt. %, or at least 35 wt. %, or at least 45 wt. %, or at least 50 wt. %, or at least 65 wt. %, or at least 75 wt. %, or at least 85 wt. %, or less than 95 wt. % insolubles using xylene as the solvent by Soxhlet extraction.

In a particular embodiment, the crosslinking is accomplished by subjecting the polymers described herein to electron beam radiation. Suitable electron beam equipment is available from E-BEAM Services, Inc., or from PCT Engineered Systems, LLC. In a particular embodiment, electrons are employed at a dose of about 200 kGy or less, or about 100 kGy or less in multiple exposures. The source can be any electron beam unit operating in a range of about 50 KeV to greater than 10 MeV with a power output capable of supplying the desired dosage. The electron voltage can be adjusted to appropriate levels, which may be, for example, 100,000 eV; 300,000 eV; 1,000,000 eV; 2,000,000 eV; 3,000,000 eV; or 6,000,000 eV. A wide range of apparatuses for irradiating polymers and polymeric articles is available.

Effective irradiation is generally carried out at a dosage from about 10 kGy to about 200 kGy, or from about 10 kGy to about 100 kGy, or from about 20 to about 90 kGy, or from about 30 to about 80 kGy, or from about 40 kGy to about 60 kGy or from about 50 kGy to about 60 kGy. In a particular aspect of this embodiment, the irradiation is carried out at room temperature.

Without wishing to be bound by theory, it is believed that two competing processes occur upon irradiation of polymers comprising propylene and ethylene, such as the inventive polymers described herein. In portions of the polymer chains containing pendant methyl groups (such as those polymer units derived from propylene), the carbon atoms in the polymer backbone are susceptible to chain scission upon irradiation, which results in lowered molecular weight. The irradiation process also breaks the bonds between carbon and hydrogen atoms comprising the backbones of the polymer chains, creating free radicals that are available to crosslink with free radicals on adjacent polymer chains. Thus, irradiation leads to crosslinking, which builds a polymer network, as well as scission, which disrupts formation of a broad polymer network. To provide polymers with good tensile and elastic properties, it is desired to reduce chain scission while encouraging crosslinking of adjacent polymer chains.

In polymers containing predominantly propylene, the dominant mechanism which takes place upon irradiation is scissioning. In polyethylene polymers, on the other hand, the dominant mechanism is crosslinking. The inclusion of ethylene-derived units in the propylene-rich polymer blends described herein therefore enhances crosslinking and reduces chain scission, leading to improved crosslinking.

To further optimize the composition herein and enhance cross-linking, both a coagent and an antioxidant may be added to the polymer blend formulation in a compounding step prior to irradiation. Again, without wishing to be bound by theory, it is believed that coagents enhance crosslinking behavior, while antioxidants suppress chain scission. The sum total, therefore, is improved crosslinking when compared to polymers having no coagent(s), antioxidant(s), or both. In other words, the polymer chains of the inventive polymer blends described herein stay longer in length due to reduced scissioning, thus, forming a crosslinked network that extends over a greater distance within the polymer blend. This enhanced crosslinking in turn leads to improved tension set, elongation, stress, and other mechanical properties of the polymers.

In another embodiment, crosslinking can be accomplished by exposure to one or more chemical agents in addition to the electron beam cure. Illustrative chemical agents include but are not limited to peroxides and other free radical generating agents, sulfur compounds, phenolic resins, and silicon hydrides. In a particular aspect of this embodiment, the crosslinking agent is either a fluid or is converted to a fluid such that it can be applied uniformly to the article. Fluid crosslinking agents include those compounds which are gases (e.g., sulfur dichloride), liquids (e.g., Trigonox C, available from Akzo Nobel), solutions (e.g., dicumyl peroxide in acetone), or suspensions thereof (e.g., a suspension or emulsion of dicumyl peroxide in water, or redox systems based on peroxides).

Illustrative peroxides include, but are not limited to dicumyl peroxide; di-tert-butyl peroxide; t-butyl perbenzoate; benzoyl peroxide; cumene hydroperoxide; t-butyl peroctoate; methyl ethyl ketone peroxide; 2,5-dimethyl-2,5-di(t-butyl peroxy)hexane; lauryl peroxide; and tert-butyl peracetate. When used, peroxide curatives are generally selected from organic peroxides. Examples of organic peroxides include, but are not limited to, di-tert-butyl peroxide; dicumyl peroxide; t-butylcumyl peroxide; α,α-bis(tert-butylperoxy)diisopropyl benzene; 2,5-dimethyl 2,5-di(t-butylperoxy)hexane; 1,1-di(t-butylperoxy)-3,3,5-trimethyl cyclohexane; butyl-4,4-bis(tert-butylperoxy) valerate; benzoyl peroxide; lauroyl peroxide; dilauroyl peroxide; 2,5-dimethyl-2,5-di(tert-butylperoxy) hexene-3; and mixtures thereof. Also, diaryl peroxides; ketone peroxides; peroxydicarbonates; peroxyesters; dialkyl peroxides; hydroperoxides; peroxyketals; and mixtures thereof may be used.

In one or more embodiments, the crosslinking can be carried out using hydrosilylation techniques.

In one or more embodiments, the crosslinking can be carried out under an inert or oxygen-limited atmosphere. Suitable atmospheres can be provided by the use of helium, argon, nitrogen, carbon dioxide, xenon and/or a vacuum.

Crosslinking either by chemical agents or by irradiation can be promoted with a crosslinking catalyst, such as organic bases, carboxylic acids, and organometallic compounds including organic titanates and complexes or carboxylates of lead, cobalt, iron, nickel, zinc, and tin (such as dibutyltindilaurate, dioctyltinmaleate, dibutyltindiacetate, dibutyltindioctoate, stannous acetate, stannous octoate, lead naphthenate, zinc caprylate, cobalt naphthenate, and the like). In the case where irradiation is accomplished via ultraviolet radiation, one or more UV sensitizers, which generate free radicals in the presence of UV radiation, may be employed to promote crosslinking. Such UV sensitizers are known in the art, and include halogenated polynuclear ketones, organic carbonyl compounds selected from alkyl phenones, benzophenones, and tricyclic fused ring compounds, and carbonylated phenol nuclear sulfonyl chlorides.

Suitable UV sensitizers may be selected from those organic chemical compounds conventionally employed to promote UV-initiated formation of radicals either by intramolecular homolytic bond cleavage or by intermolecular hydrogen abstraction. Such agents include organic compounds having aryl carbonyl or tertiary amino groups. Among the compounds suitable for use are benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; benzil dimethoxyketal; benzoin methyl ether; and phenyl glyoxal. Upon exposure to UV radiation, a variety of photochemical transformations may occur, for example, the UV initiator may form free radical reactive fragments that react with the acrylate end groups of the multifunctional acrylic or methacrylic crosslinking agent. This initiates crosslinking of the polymer as well as homopolymerization of the acrylic or methacrylic crosslinking agent.

In one embodiment, the UV sensitizer includes at least one of a benzophenone photoinitiator; a phenylglyoxylate photoinitiator; an alpha hydroxy ketone photoinitiator; a combination of acyl phosphine oxide and an alpha hydroxy ketone photoinitiator; 2,2-aimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. Commercially available photoinitiators include Darocur BP, Darocur MBF, Irgacur 651, and Irgacure 754, available from Ciba Geigy, now BASF Chemical Company.

In one or more embodiments, the composition contains at least 0.1 wt. % of a UV sensitizer, based on the total weight of the composition. In one or more embodiments, the amount of UV sensitizer(s) can range from about 0.1 wt. % to about 10 wt. %, based on the total weight of the composition. In one or more embodiments, the amount of UV sensitizers(s) can range from a low of about 0.1 wt. %, 0.2 wt. %, 0.3 wt. %, 0.5 wt. %, or 1 wt. %, to a high of about 2.5 wt. %, 3 wt. %, 5 wt. %, or 8 wt. %, based on the total weight of the composition. In one or more embodiments, the amount of UV sensitizers(s) is about 1 wt. % to about 3 wt. %, based on the total weight of the composition. In one or more embodiments, the amount of UV sensitizers(s) is about 1 wt. %, 1.5 wt. %, or 2 wt. %, based on the total weight of the composition.

The wavelength spectrum of UV radiation used to effect the curing reaction typically corresponds to the absorption maximum of the UV initiator. The wavelength can be from about 10 nm to about 400 nm. Preferably, the wavelength is from about 100 to about 400 nm, preferably about 200 to about 350 nm. Suitable UV radiation sources include medium pressure mercury vapor lamps, electrodeless lamps, pulsed xenon lamps, and hybrid xenon/mercury vapor lamps. An exemplary arrangement comprises one or more lamps together with a reflector, which diffuses the radiation evenly over the surface to be irradiated. Suitable UV radiation equipment includes those available from Fusion UV System Inc., such as the F300-6 curing chamber.

Examples

The foregoing discussion can be further described with reference to the following non-limiting examples. Compositions containing at least one propylene-based copolymer in accordance with one or more embodiments described were prepared.

Table 1 summarizes the formulations of the compositions. The materials used the invention are as follows.

VM6102 is a polymer blend having 16 wt. % of ethylene and no diene-derived units and is commercially available from ExxonMobil Chemical Company under the tradename Vistamaxx™ 6102 propylene-based polymer.

VM6100 is a metallocene-catalyzed propylene/ethylene copolymer having 16 wt. % of ethylene and no diene-derived units and is commercially available from ExxonMobil Chemical Company under the tradename Vistamaxx™ 6100 propylene-based polymer.

Exact 5101 is an ethylene-octene copolymer and is commercially available from ExxonMobil Chemical Company.

TAC is a triallylcyanurate commercially available from Sartomer Company under the trade name Sartomer 507.

PLB 6941 is a master batch of TAC commercially available from Flo Polymers.

PP 5341 is a 0.8 MFR (230° C., 2.16 kg) isotactic polypropylene (iPP) that is commercially available from ExxonMobil Chemical Company.

RCP 9122 is a random copolymer containing 2-3 wt. % of ethylene derived units, the balance is propylene. The RCP 9122 has a MFR (2.16 kg at 230° C.) of 2.1 g/10 min and a density of 0.9 g/cm$^3$. The 1% secant flexural modulus is 140 kPsi, as measured by ASTM D790A. RCP 9122 is commercially available from ExxonMobil Chemical Company.

Sartomer 350 is a trimethylolpropane trimethacrylate co-agent that is commercially available from Sartomer Company, Inc. located in Exton, Pa.

Irgafos 168 is an antioxidant commercially available from Ciba Specialty Chemicals.

MDV 91-9 is an EP copolymer (ExxonMobil Chemical) with about 60 wt. % ethylene and has a Mooney viscosity (ML (1+4) at 125° C.) about 19 and narrow molecular weight distribution.

TABLE 1

| Material, phr (parts by weight) | Comparative Examples | | | | | Examples | | |
|---|---|---|---|---|---|---|---|---|
| | 1 | 2 | 3 | 4 | 5 | 1 | 2 | 3 |
| VM6100 | 100 | 90 | 79 | | | | | |
| PP 5341 | | 10 | 5 | 5 | | 5 | | |
| Exact 5101 | | | 14 | | | | | |
| Exxon RCP 9122 | | | | | 5 | | 5 | 5 |

TABLE 1-continued

Formulations

| Material, phr (parts by weight) | Comparative Examples | | | | | Examples | | |
|---|---|---|---|---|---|---|---|---|
| | 1 | 2 | 3 | 4 | 5 | 1 | 2 | 3 |
| TAC (triallyl cyanurate) | | | | | | 5 | | |
| PLB 6941 (TAC) | | | 2 | | | | | |
| Sartomer 350 | | | | | | | 3 | 3 |
| Irgastab FS 410 | | | | | | | | |
| Irgafos 168 | | | | | | 0.2 | 0.2 | 0.2 |
| MDV 91-9 | | | | | | | | 10 |
| VM 6102 | | | | 95 | 95 | 89.8 | 91.8 | 81.8 |
| Total PHR | 100.00 | 100.00 | 100.00 | 100 | 100 | 100.00 | 100.00 | 100.00 |

VM6102 propylene-based polymers were compounded with a polypropylene, a coagent, an antioxidant, or combinations thereof. Each composition was prepared in a Brabender thermoplastic compounder. The pellets of blends of the propylene-based polymers with thermoplastic components were charged into the Brabender in the presence of a nitrogen blanket along with the antioxidants at a melt temperature of 150° C. for 3 minutes. The temperature was then lowered to 140° C. and the coagent, antioxidant, and/or polypropylene were added and mixed for about 2 minutes to obtain a homogenous blend. The compounded blends were then molded into plaques having a thickness of 75 mils and films having a thickness of 10 mils on a compression molding press.

The resulting compounded formulations, identified herein as Examples 1 to 3, were crosslinked using electron beam radiation, first at 50 kGy and then at 60 kGy. The mechanical properties of Examples 1-3 are reported in Table 2 below.

Comparative examples 1-5 were also prepared from the propylene-based polymer VM 6102 and VM 6100 by the same procedure, except that the blends do not contain a coagent and an antioxidant. The mechanical properties of Comparative Examples 1-5 are reported in Table 2 below.

Physical properties of the compositions were evaluated before and after curing. Hardness was tested according to ASTM 2240, and the tension set of the blends was tested according to ASTM D412 at room temperature and 70° C. For room temperature and 70° C. testing for tension set, the sample was aged at the test temperature for 30 minutes under 50% tension on Jig and annealed at room temperature for 30 minutes after removing from the Jig. A xylene Soxhlet solvent extraction test was conducted according to ASTM D5492 on the cured samples using a Soxhlet extractor (extraction time=12 hrs) to understand the level of crosslinked material after electron beam curing. Results are expressed as: percent xylene insoluble=weight after extraction/weight before extraction*100.

TABLE 2

Properties of blends before and after electron beam crosslinking.

| TESTED PROPERTIES | Comparative Examples | | | | | Examples | | |
|---|---|---|---|---|---|---|---|---|
| | 1 | 2 | 3 | 4 | 5 | 1 | 2 | 3 |
| Before Electron-beaming | | | | | | | | |
| Hardness, Shore A, 15 s. | 59 | 66 | 69 | 57 | 55 | 53.8 | 59 | 60 |
| Stress at Break, MPa | 10.2 | 12.7 | 13.6 | 9.7 | 10.7 | | 13.0 | 11.6 |
| Elongation at break, (%) | 791 | 774 | 778 | 1013 | 1012 | did not break | 861 | 838 |
| Peak stress, (MPa) | N/A | N/A | N/A | N/A | N/A | 9.0 | 13.1 | 11.9 |
| Peak Elongation, (%) | N/A | N/A | N/A | N/A | N/A | 840 | 840 | 820 |
| 100% Mod. (MPa) | 1.9 | 2.4 | 2.6 | 1.6 | 1.6 | 1.61 | 2.0 | 1.9 |
| Tension Set (%), 23° C. | 4 | 5 | 5 | N/A | N/A | 8 | N/A | N/A |
| Tension Set (%), 70° C. | Broke | 49 | 50 | N/A | N/A | 46 | N/A | N/A |
| MFR (230 C., 2.16 kg) | 4.3 | 3.3 | 3.7 | 3.1 | 3.2 | 4.4 | 3.5 | 3.1 |
| Electron-beamed at 50 kGy | | | | | | | | |
| Hardness, Shore A, 15 s. | 59 | 65 | 66 | NA | NA | NA | NA | NA |
| Stress at Break, MPa | 6.0 | 9.2 | 9.7 | 5.5 | 7.0 | 8.2 | 14.3 | 12.1 |
| Elongation at break, (%) | 791 | 787 | 787 | 1834 | 2004 | 954 | 789 | 818 |
| Peak stress, (MPa) | N/A | N/A | N/A | N/A | N/A | N/A | 14.6 | 12.7 |
| Peak Elongation, (%) | N/A | N/A | N/A | N/A | N/A | N/A | 740 | 800 |
| 100% Mod. (MPa) | 1.7 | 2.3 | 2.4 | 1.5 | 1.6 | 1.6 | 2.7 | 2.4 |
| Tension Set (%), 23° C. | 4 | 5 | 4 | NA | NA | 5 | 4.0 | 5.0 |
| Tension Set (%), 70° C. | 42 | 40 | 37 | NA | NA | 40 | 32.5 | 33.0 |
| Xylene Extraction, % insoluble | 0 | 0 | 27 | N/A | N/A | 32 | 74 | 59 |
| Electron-beamed at 60 kGy | | | | | | | | |
| Stress at Break, MPa | N/A | N/A | N/A | 5.7 | 6.0 | N/A | 15.4 | 11.9 |
| Elongation at break, (%) | N/A | N/A | N/A | 1949 | 2190 | N/A | 805 | 807 |
| Peak stress, (MPa) | N/A | N/A | N/A | N/A | N/A | N/A | 15.6 | 12.6 |
| Peak Elongation, (%) | N/A | N/A | N/A | N/A | N/A | N/A | 700 | 780 |

TABLE 2-continued

Properties of blends before and after electron beam crosslinking.

| TESTED PROPERTIES | Comparative Examples | | | | | Examples | | |
|---|---|---|---|---|---|---|---|---|
| | 1 | 2 | 3 | 4 | 5 | 1 | 2 | 3 |
| 100% Mod. (MPa) | N/A | N/A | N/A | 1.4 | 1.4 | N/A | 2.7 | 2.5 |
| Tension Set (%), 23° C. | N/A | N/A | N/A | N/A | N/A | N/A | 5.0 | 4.0 |
| Tension Set (%), 70° C. | N/A | N/A | N/A | N/A | N/A | N/A | 32.0 | N/A |
| Xylene Extraction, % insoluble | N/A | N/A | N/A | N/A | N/A | N/A | 75 | 75 |

As is evident from a comparison of the mechanical properties of Examples 1-3 with those of Comparative Examples 1-5, the addition of at least one coagent and at least one antioxidant to the polymer blends of the invention results in greatly improved mechanical properties. For example, a comparison of the difference in peak stress before and after electron-beaming for all of the examples shows that the peak stress measurements increase (i.e., improve) for Examples 1-3, which contain a coagent and an antioxidant, while the peak stress measurements for Comparative Examples 1-5 decrease (i.e., worsen) upon crosslinking. A similar comparison of tension set values at 70° C. for all examples shows that, while an improvement in tension set (indicated by a decrease in the tension set %) is exhibited by all of the samples, the improvement is much greater for those samples containing both a coagent and an antioxidant. The results shows that the crosslinking by electron beam of those compositions containing both a coagent and an antioxidant are effective even though the propylene-based polymer substantially lacking diene-derived units.

Figure 2:
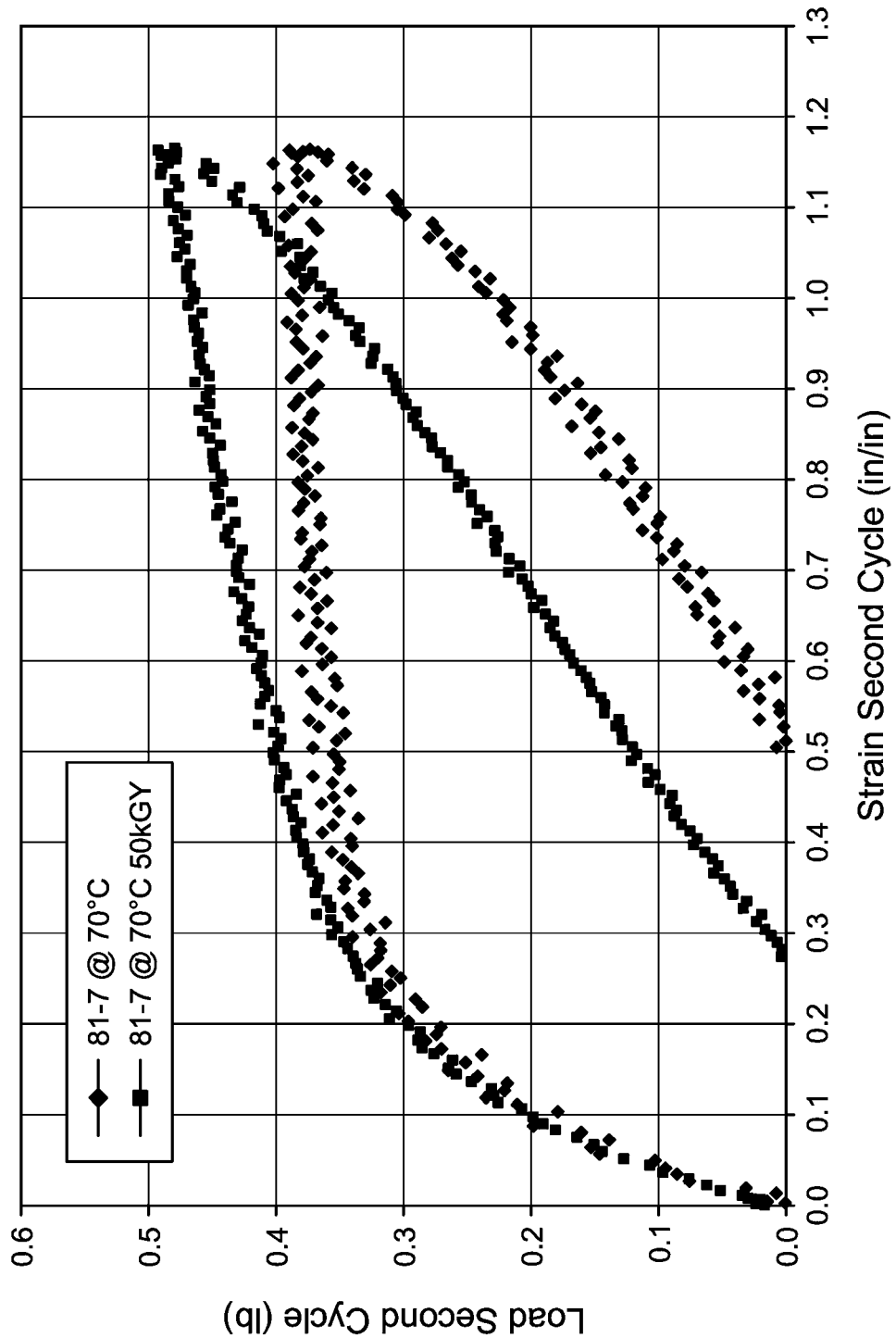

FIGS. 1 and 2 illustrate the improved tensile properties and hysteresis properties which result from the crosslinking of the composition. In particular, FIG. 1 shows the improvement of Tension Set at 70° C. of the composition of Example 2 after 50 kGy electron beam radiation. FIG. 2 shows the improvement of Tension Set at 70° C. of the composition of Example 3 after 50 kGy electron beam radiation.

Fiber properties of selected blends were also evaluated. Blends of Examples 2 and 3 were selected based on their excellent balance of physical properties. To test the physical properties of the fibers, the selected blends were spun into fiber using a partially oriented yarn line having a L:D ratio of 24:1. The spinnerette had 72 holes. Each hole had a diameter of 0.6 mm. The output of the line ranged from about 0.4 to 2 gram/hole/min, with a Godet speed close to 5,000 m/min and a winding speed of from 100 m/min to 3,000 m/min. The extruded fibers were cooled by quenched air having a temperature of about 45° F. to 55° F.

Table 3 summarizes the physical properties of both the cured and uncured fibers. As shown below, the cured fibers exhibited excellent spinnability and fiber formation.

TABLE 3

Properties of fibers

| Blend (Run#) | Winding speed, m/min | Electron beam dosage, KGy | Count, den (72 filaments) | Tenacity, g/den | Elongation, % | Xylene insoluble, % | TS,% at 23° C. | TS,% at 70° C. |
|---|---|---|---|---|---|---|---|---|
| 2(#1) | 260 | 0 | 1609 | 0.49 | 161 | n/a | 5.5 | 22 |
| 2(#2) | 260 | 40 | 1609 | 0.41 | 124 | 24 | 2.5 | 24 |
| 2(#3) | 260 | 0 | 1625 | 0.51 | 158 | n/a | 1 | 14 |
| 2(#4) | 260 | 50 | 1629 | 0.36 | 109 | 30 | 5 | 21 |
| 2(#5) | 260 | 0 | 1542 | 0.4 | 122 | n/a | 1.5 | 17.5 |
| 2(#6) | 260 | 60 | 1536 | 0.42 | 128 | 27 | 4 | 17.5 |
| 2(#7) | 260 | 0 | 1609 | 0.41 | 127 | n/a | 2 | 17 |
| 2(#8) | 260 | 100 | 1643 | 0.35 | 137 | 33 | 1 | 20 |
| 3(#9) | 145 | 0 | 2923 | 0.26 | 130 | n/a | 2 | 29 |
| 3(#10) | 145 | 40 | 2863 | 0.29 | 166 | 24 | 1 | 21 |
| 3(#11) | 145 | 0 | 2919 | 0.31 | 193 | n/a | 0.5 | 20 |
| 3(#12) | 145 | 50 | 2866 | 0.27 | 177 | 30 | 0.5 | 22 |
| 3(#13) | 145 | 0 | 2968 | 0.28 | 143 | n/a | 1 | 30 |
| 3(#14) | 145 | 60 | 2868 | 0.3 | 209 | 30 | 2 | 25 |
| 3(#15) | 145 | 0 | 2998 | 0.27 | 153 | n/a | 0.5 | 20 |
| 3(#16) | 145 | 100 | 2901 | 0.25 | 165 | 40 | 0.5 | 20 |

Monolayer films from blends 2 and 3 were also prepared. The films were made by compression molding, similar to the process used for making the plaques. The thickness of each film was about 10 mil.

The results are shown below in Table 4, including the physical properties of the films before electron beam cure and after electron beam cure using a dosage of 50 kGy.

TABLE 4

Properties of Films

| PROPERTIES | Blend | |
|---|---|---|
| | 2 | 3 |
| Before Electron beaming | | |
| Stress at Break, psi | 2508 | 2345 |
| Elongation at break, (%) | 1868 | 1790 |
| 100% Mod. (psi) | 305 | 299 |
| Energy at Break, in * lbf | 31.3 | 27.4 |

TABLE 4-continued

Properties of Films

|  | Blend | |
| --- | --- | --- |
| PROPERTIES | 2 | 3 |
| After Electron beamed at 50 kGy | | |
| Stress at Break, psi | 2368 | 2383 |
| Elongation at break, (%) | 1591 | 1767 |
| 100% Mod., psi | 349 | 337 |
| Energy at Break, in * lbf | 24.6 | 28.1 |
| Xylene Extraction, % insolubles | 41 | 44 |

It was surprisingly found that the electron beam cured films maintained their tensile strength after curing even at such high levels of crosslinking as measured by the xylene extraction, percent insolubles. The opposite would have been expected considering the strength properties of cured films are usually sacrificed during crosslinking.

For purposes of convenience, various specific test procedures are identified above for determining certain properties such as tension set, percent elongation at break, Shore A Hardness, etc. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims. All numerical values can be considered to be "about" or "approximately" the stated value, in view of the nature of testing in general.

Having described the various aspects of the compositions herein, further specific embodiments of the invention include those set forth in the following lettered paragraphs:

AA. A method for making a crosslinked composition comprising the step of crosslinking the composition using electron beam radiation having an electron beam dose of about 200 kGy or less, the composition comprising:
   i) a propylene-based polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the propylene-based polymer;
   ii) at least one of a multifunctional acrylate, multifunctional methacrylate, functionalized polybutadiene resin, functionalized cyanurate, and allyl isocyanurate; and
   iii) at least one of a hindered phenol, phosphite, and hindered amine AB. The method of Paragraph AA, wherein the electron beam dose is about 100 kGy.

AC. The method of Paragraphs AA or AB, wherein the electron beam dose is of from about 40 kGy to about 60 kGy.

AD. The method of any of Paragraphs AA-AC, wherein the propylene-based polymer comprises less than 0.05 wt. % diene-derived units based on the weight of the propylene-based polymer.

AE. The method of any of Paragraphs AA-AD, wherein the propylene-based polymer comprises less than 0.01 wt. % diene-derived units based on the weight of the propylene-based polymer.

AF. The method of any of Paragraphs AA-AE, wherein the propylene-based polymer comprises 0 wt. % diene-derived units based on the weight of the propylene-based polymer.

AG. The method of any of Paragraphs AA-AF, wherein the propylene-based polymer comprises from about 1 wt. % to about 25 wt. % units derived from ethylene, butene, hexene, and/or octane based on the weight of the propylene-based polymer.

AH. The method of any of Paragraphs AA-AG, wherein the propylene-based polymer comprises from about 5 wt. % to about 25 wt. % of units derived from ethylene and/or butene based on the weight of the propylene-based polymer.

AI. The method of any of Paragraphs AA-AH, wherein the propylene-based polymer comprises from about 5 wt. % to about 25 wt. % of units derived from ethylene and/or hexene based on the weight of the propylene-based polymer.

AJ. The method of any of Paragraphs AA-AI, wherein the propylene-based polymer has a heat of fusion from about 0.5 J/g to about 80 J/g.

AK. The method of any of Paragraphs AA-AJ, wherein the propylene-based polymer has a triad tacticity of three propylene units, as determined by $^{13}C$ NMR, of 75% or greater.

AL. The method of any of Paragraphs AA-AK, wherein the propylene-based polymer is a polymer blend formed by forming a reactor blend of a first polymer formed in a first reactor and a second polymer formed in a second reactor, the first polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the first polymer; and the second polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the second polymer.

AM. The method of Paragraph AL, wherein the first polymer comprises from about 12 wt. % to about 20 wt. % ethylene-derived units based on the weight of the first polymer.

AN. The method of Paragraphs AL or AM, wherein the second polymer comprises from about 3 wt. % to about 10 wt. % ethylene-derived units based on the weight of the second polymer.

AO. The method of any of Paragraphs AL-AN, wherein the polymer blend comprises from about 10 wt. % to about 18 wt. % ethylene-derived units based on the weight of the polymer blend.

AP. The method of any of Paragraphs AA-AO, wherein the at least one of multifunctional acrylate, multifunctional methacrylate, functionalized polybutadiene resin, functionalized cyanurate, and allyl isocyanurate is present in an amount of from about 0.1 wt. % to 15 wt. % based on the weight of the composition.

AQ. The method of any of Paragraphs AA-AP, wherein the at least one of hindered phenol, phosphite, and hindered amine is present in an amount of from about 0.1 wt. % to 5 wt. % based on the weight of the composition.

AR. The method of any of Paragraphs AA-AQ, wherein the composition further comprises at least one of a secondary elastomer and polyolefinic thermoplastic resin.

AS. The method of any of Paragraphs AA-AR, wherein the polyolefinic thermoplastic resin comprises at least one of an isotactic polypropylene, random copolymer, and impact copolymer.

AT. An article comprising the crosslinked composition made by the method of Paragraphs AA-AS.

AU. The article of Paragraph AV comprising film or nonwoven fiber.

AV. A composition comprising:
i) a polymer blend formed by forming a reactor blend of a first polymer formed in a first reactor and a second polymer formed in a second reactor, the first polymer comprising from about 75 wt. % to about 99 wt. % propylene-derived units, from about 1 wt. % to about 25 wt. % ethylene and/or $C_4$-$C_{20}$ α-olefin-derived units, and less than 0.05 wt. % diene-derived units based on the weight of the first polymer; and the second polymer comprising from about 75 wt. % to about 99 wt. % propylene-derived units, from about 1 wt. % to about 25 wt. % ethylene and/or $C_4$-$C_{20}$ α-olefin-derived units, and less than 0.05 wt. % diene-derived units based on the weight of the second polymer;
ii) at least one of a multifunctional acrylate, multifunctional methacrylate, functionalized polybutadiene resin, functionalized cyanurate, and allyl isocyanurate; and
iii) at least one of a hindered phenol, phosphite, and hindered amine AW. The composition of Paragraph AV, wherein the polymer blend comprises 0 wt. % diene-derived units based on the weight of the polymer blend.

AX. The composition of Paragraph AV being subjected to electron beam radiation having an electron beam dose of about 200 kGy or less.

AY. The composition of Paragraph AV being subjected to electron beam radiation having an electron beam dose of about 40 kGy to about 60 kGy.

AZ. The composition of Paragraphs AX or AY having greater than 40% xylene insolubles as measured according to ASTM-D 5492.

BA. A crosslinked composition, comprising:
i) a propylene-based polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the propylene-based polymer;
ii) at least one of a multifunctional acrylate, multifunctional methacrylate, functionalized polybutadiene resin, functionalized cyanurate, and allyl isocyanurate;
iii) at least one of a hindered phenol, phosphite, and hindered amine; and
iv) a polyolefinic thermoplastic resin,
wherein the crosslinked composition has greater than 40% xylene insolubles as measured according to ASTM-D 5492.

BB. The crosslinked composition of Paragraph BA, wherein the propylene-based polymer comprising 0 wt. % diene-derived units based on the weight of the propylene-based polymer.

BC. The crosslinked composition of Paragraphs BA or BB, wherein the multifunctional methacrylate comprises trimethylolpropane trimethacrylate.

BD. An article comprising the crosslinked composition of any of Paragraphs BA-BC.

BE. The article of Paragraph BD comprising film or nonwoven fiber.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

Each of the appended claims defines a separate invention, which for infringement purposes is recognized as including equivalents of the various elements or limitations specified in the claims. Depending on the context, all references herein to the "invention" may in some cases refer to certain specific embodiments only. In other cases it will be recognized that references to the "invention" will refer to subject matter recited in one or more, but not necessarily all, of the claims. Each of the inventions is described herein, including specific embodiments, versions and examples, but the inventions are not limited to these embodiments, versions or examples, which are included to enable a person having ordinary skill in the art to make and use the inventions, when the information in this patent is combined with available information and technology.

What is claimed is:

1. A method for making a crosslinked composition comprising the step of crosslinking the composition using electron beam radiation having an electron beam dose of about 200 kGy or less, the composition comprising:
i) one or more propylene-based polymers each comprising from about 75 wt. % to about 99 wt. % propylene-derived units, and from about 1 wt. % to about 25 wt. % ethylene and/or $C_4$-$C_{20}$ α-olefin-derived units;
wherein at least one of the one or more propylene-based polymers is a polymer blend formed by forming a reactor blend of a first polymer formed in a first reactor and a second polymer formed in a second reactor, the first polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the first polymer; and the second polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the second polymer;
ii) at least one of a multifunctional acrylate, multifunctional methacrylate, functionalized polybutadiene resin, functionalized cyanurate, and allyl isocyanurate; and
iii) at least one of a hindered phenol, phosphite, and hindered amine;
wherein each propylene-based polymer in the composition comprises less than 0.1 wt. % diene derived units, based on the weight of that propylene-based polymer.

2. The method of claim 1, wherein the electron beam dose is about 100 kGy or less.

3. The method of claim 1, wherein the electron beam dose is of from about 40 kGy to about 60 kGy.

4. The method of claim 1, wherein each propylene-based polymer comprises less than 0.01 wt. % diene-derived units based on the weight of that propylene-based polymer.

5. The method of claim 1, wherein each propylene-based polymer comprises 0 wt. % diene-derived units based on the weight of that propylene-based polymer.

6. The method of claim 1, wherein at least one of the one or more propylene-based polymers comprises from about 5 wt. % to about 25 wt. % units derived from ethylene, butene, hexene, and/or octane based on the weight of that one of the propylene-based polymers.

7. The method of claim 1, wherein at least one of the first polymer and the second polymer has a heat of fusion from about 0.5 J/g to about 80 J/g.

8. The method of claim 1, wherein at least one of the first polymer and the second polymer has a triad tacticity of three propylene units, as determined by $^{13}$C NMR, of 75% or greater.

9. The method of claim 1, wherein the first polymer comprises from about 12 wt. % to about 20 wt. % ethylene-derived units based on the weight of the first polymer.

10. The method of claim 1, wherein the second polymer comprises from about 3 wt. % to about 10 wt. % ethylene-derived units based on the weight of the second polymer.

11. The method of claim 1, wherein the polymer blend comprises from about 10 wt. % to about 18 wt. % ethylene-derived units based on the weight of the polymer blend.

12. The method of claim 1, wherein the at least one of multifunctional acrylate, multifunctional methacrylate, functionalized polybutadiene resin, functionalized cyanurate, and allyl isocyanurate is present in an amount of from about 0.1 wt. % to 15 wt. % based on the weight of the composition.

13. The method of claim 1, wherein the at least one of hindered phenol, phosphite, and hindered amine is present in an amount of from about 0.1 wt. % to 5 wt. % based on the weight of the composition.

14. The method of claim 1, wherein the composition further comprises at least one of a secondary elastomer and a polyolefinic thermoplastic resin.

15. The method of claim 14, wherein the polyolefinic thermoplastic resin comprises at least one of an isotactic polypropylene, a random copolymer, and an impact copolymer.

16. An article comprising a crosslinked composition made by the method of claim 1.

17. The article of claim 16 comprising film or nonwoven fiber.

18. A composition comprising:
i) a polymer blend formed by forming a reactor blend of a first polymer formed in a first reactor and a second polymer differing in olefin content from the first polymer and formed in a second reactor, the first polymer comprising from about 75 wt. % to about 99 wt. % propylene-derived units, from about 1 wt. % to about 25 wt. % ethylene and/or $C_4$-$C_{20}$ α-olefin-derived units, and less than 0.05 wt. % diene-derived units based on the weight of the first polymer; and the second polymer comprising from about 75 wt. % to about 99 wt. % propylene-derived units, from about 1 wt. % to about 25 wt. % ethylene and/or $C_4$-$C_{20}$ α-olefin-derived units, and less than 0.05 wt. % diene-derived units based on the weight of the second polymer;
ii) at least one of a multifunctional acrylate, multifunctional methacrylate, functionalized polybutadiene resin, functionalized cyanurate, and allyl isocyanurate; and
iii) at least one of a hindered phenol, phosphite, and hindered amine.

19. The composition of claim 18, wherein the polymer blend comprises 0 wt. % diene-derived units based on the weight of the polymer blend.

20. The composition of claim 18, wherein the composition is subjected to electron beam radiation having an electron beam dose of about 100 kGy or less.

21. The composition of claim 20 having greater than 40% xylene insolubles as measured according to ASTM-D 5492.

22. A crosslinked composition, comprising:
i) one or more propylene-based polymers each comprising from about 75 wt. % to about 99 wt. % propylene-derived units, from about 1 wt. % to about 25 wt. % ethylene and/or $C_4$-$C_{20}$ α-olefin-derived units;
wherein at least one of the one or more propylene-based polymers is a polymer blend formed by forming a reactor blend of a first polymer formed in a first reactor and a second polymer formed in a second reactor, the first polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the first polymer; and the second polymer comprising from about 75 wt. % to about 99 wt. % propylene-derived units, from about 1 wt. % to about 25 wt. % ethylene and/or $C_4$-$C_{20}$ α-olefin-derived units, and less than 0.1 wt. % diene-derived units, based on the weight of the second polymer;
ii) at least one of a multifunctional acrylate, multifunctional methacrylate, functionalized polybutadiene resin, functionalized cyanurate, and allyl isocyanurate;
iii) at least one of a hindered phenol, phosphite, and hindered amine; and
iv) a polyolefinic thermoplastic resin,
wherein the crosslinked composition has greater than 40% xylene insolubles as measured according to ASTM-D 5492; and
wherein each propylene-based polymer in the composition comprises less than 0.1 wt. % diene derived units, based on the weight of that propylene-based polymer.

23. The crosslinked composition of claim 22, wherein each propylene-based polymer comprises 0 wt. % diene-derived units based on the weight of the propylene-based polymer.

24. An article comprising the crosslinked composition of claim 22.

* * * * *